United States Patent
Hansen et al.

(10) Patent No.: US 11,162,722 B2
(45) Date of Patent: Nov. 2, 2021

(54) RETROFITTING R410A HVAC PRODUCTS TO HANDLE FLAMMABLE REFRIGERANTS

(71) Applicant: TRANE INTERNATIONAL INC., Davidson, NC (US)

(72) Inventors: William G. Hansen, Coon Valley, WI (US); Stephen A. Kujak, Brownsville, MN (US)

(73) Assignee: TRANE INTERNATIONAL INC., Davidson, NC (US)

( * ) Notice: Subject to any disclaimer, the term of this patent is extended or adjusted under 35 U.S.C. 154(b) by 75 days.

(21) Appl. No.: 16/227,379

(22) Filed: Dec. 20, 2018

(65) Prior Publication Data

US 2019/0195542 A1    Jun. 27, 2019

Related U.S. Application Data (60) Provisional application No. 62/610,464, filed on Dec. 26, 2017.

(51) Int. Cl.
*F25B 45/00* (2006.01)
*F24F 11/526* (2018.01)
(Continued)

(52) U.S. Cl.
CPC ............. *F25B 45/00* (2013.01); *F24F 7/013* (2013.01); *F24F 11/36* (2018.01); *F24F 11/526* (2018.01);
(Continued)

(58) Field of Classification Search
CPC .................. F25B 45/00; F25B 2400/12; F25B 2500/222; F24F 1/34; F24F 11/36
See application file for complete search history.

(56) References Cited

U.S. PATENT DOCUMENTS

| 5,918,475 A * | 7/1999 | Sakakibara | B60H 1/008 |
| | | | 62/126 |
| 6,536,225 B1 * | 3/2003 | Yajima | F24F 1/02 |
| | | | 62/407 |

(Continued)

FOREIGN PATENT DOCUMENTS

| EP | 3040654 A1 | 7/2016 |
| JP | 2002174448 A | 6/2002 |
| WO | 2013/038599 A1 | 3/2013 |

OTHER PUBLICATIONS

Extended European Search Report, European Patent Application No. 18213237.3, dated Apr. 8, 2019 (10 pages).

(Continued)

*Primary Examiner* — Christopher R Zerphey
(74) *Attorney, Agent, or Firm* — Hamre, Schumann, Mueller & Larson, P.C.

(57) ABSTRACT

A system and method of retrofitting a heating, ventilation, air conditioning, and refrigeration system (HVACR) including one or more brazed, soldered, or mechanical connections between refrigerant lines is disclosed. The method includes removing a refrigerant from the HVACR system. The refrigerant that is removed is a non-flammable refrigerant. An enclosure is installed over the one or more brazed, soldered, or mechanical connections between refrigerant lines. A refrigerant is added to the HVACR system. The refrigerant being added has a global warming potential (GWP) that is relatively lower than the refrigerant removed from the HVACR system. The refrigerant being added has a relatively higher flammability than the refrigerant removed from the HVACR system.

7 Claims, 6 Drawing Sheets

(51) Int. Cl.
*F24F 7/013* (2006.01)
*F24F 11/36* (2018.01)
*F24F 110/76* (2018.01)

(52) U.S. Cl.
CPC ....... *F24F 2110/76* (2018.01); *F25B 2400/12* (2013.01); *F25B 2500/222* (2013.01)

(56) References Cited

U.S. PATENT DOCUMENTS

| | | | |
|---|---|---|---|
| 7,013,665 B2* | 3/2006 | Matsuoka | F16L 23/167 |
| | | | 62/298 |
| 8,104,303 B2* | 1/2012 | Murata | F24F 1/32 |
| | | | 62/290 |
| 2010/0154453 A1* | 6/2010 | Winkler | F24F 1/32 |
| | | | 62/259.1 |

OTHER PUBLICATIONS

Paul Evans, "Refrigerant Retrofit Guide—The Engineering Mindset", Available online at https://theengineeringmindset.com/refrigerant-retrofit-guide/, retrieved on Mar. 29, 2019.

\* cited by examiner

RETROFITTING R410A HVAC PRODUCTS TO HANDLE FLAMMABLE REFRIGERANTS

FIELD

This disclosure relates generally to a heating, ventilation, air conditioning, and refrigeration (HVACR) system. More specifically, the disclosure relates to retrofitting equipment in an HVACR system to utilize a more environmentally friendly refrigerant.

BACKGROUND

HVACR systems generally include a compressor, condenser, expansion device, and evaporator fluidly connected to form a refrigerant circuit. A refrigerant is provided for the refrigerant circuit. The refrigerant can be, for example, R-410A or similar refrigerants that are non-flammable.

SUMMARY

This disclosure relates generally to a heating, ventilation, air conditioning, and refrigeration (HVACR) system. More specifically, the disclosure relates to retrofitting equipment in an HVACR system to utilize a more environmentally friendly refrigerant.

In an embodiment, an HVACR system can utilize R-410A as its refrigerant. In an embodiment, the R-410A refrigerant can be replaced with an alternative refrigerant. In an embodiment, the alternative refrigerant can be an environmentally friendly refrigerant having a lower global warming potential (GWP) than R-410A. In an embodiment, the HVACR system can utilize another refrigerant such as, but not limited to, R-22, R-404A, R-134A, or the like.

A suitable alternative refrigerant includes, but is not limited to, DR-55. In an embodiment, DR55 may alternatively be referred to as R-452B. In an embodiment, the alternative refrigerant can alternatively be, for example, R-32, R-454B, or the like In an embodiment, the HVACR system includes at least a portion of equipment that is disposed within an occupied (or potentially occupied) space within the building. In an embodiment, the HVACR system includes equipment having brazed, soldered, or other mechanical connections in the occupied space that are external to the HVACR equipment. In an embodiment, to retrofit the HVACR system with environmentally refrigerant, sealed enclosures may be installed over the brazed, soldered, or other mechanical connections. In an embodiment, the sealed enclosures may include a vent. In an embodiment, the HVACR system can be retrofit to include one or more alarms or other failsafe features that will prevent operation of the HVACR system without appropriately installed enclosures and/or to provide an indication of a refrigerant leak.

In an embodiment, a method of retrofitting includes removing an existing refrigerant and replacing or modifying an expansion device in the system.

In an embodiment, the existing refrigerant that is removed can be reclaimed, recycled, and/or reformulated into lower GWP refrigerants.

A method of retrofitting a heating, ventilation, air conditioning, and refrigeration system (HVACR) including one or more brazed, soldered, or mechanical connections between refrigerant lines is disclosed. The method includes removing a refrigerant from the HVACR system. The refrigerant that is removed is a non-flammable refrigerant. An enclosure is installed over the one or more brazed, soldered, or mechanical connections between refrigerant lines. A refrigerant is added to the HVACR system. The refrigerant being added has a global warming potential (GWP) that is relatively lower than the refrigerant removed from the HVACR system. The refrigerant being added has a relatively higher flammability than the refrigerant removed from the HVACR system.

A heating, ventilation, air conditioning, and refrigeration (HVACR) system is disclosed. The HVACR system includes an indoor system. The indoor system includes one or more refrigerant lines; a brazed, soldered, or mechanical connection; and an enclosure. The enclosure includes a housing that encloses the brazed, soldered, or mechanical connection. A refrigerant circuit for the HVACR system includes a refrigerant that is a flammable refrigerant.

A system is disclosed. The system includes an interior space and an HVACR system. The HVACR system includes an indoor system and an outdoor system. The indoor system is disposed within the interior space. The indoor system includes one or more refrigerant lines and a brazed, soldered, or mechanical connection, an enclosure including a housing that encloses the brazed, soldered, or mechanical connection, and a refrigerant circuit. A refrigerant in the refrigerant circuit includes a flammable refrigerant.

BRIEF DESCRIPTION OF THE DRAWINGS

References are made to the accompanying drawings that form a part of this disclosure and which illustrate embodiments in which the systems and methods described in this specification can be practiced.

Like reference numbers represent like parts throughout.

DETAILED DESCRIPTION

This disclosure relates generally to a heating, ventilation, air conditioning, and refrigeration (HVACR) system. More specifically, the disclosure relates to retrofitting equipment in an HVACR system to utilize a more environmentally friendly refrigerant.

Approximately 60-80% of the market share for HVACR systems involves retrofitting existing equipment, for example, to utilize a more environmentally friendly refrigerant. More environmentally friendly refrigerants may have an increased flammability relative to the existing refrigerant. Retrofitting an HVACR system to utilize a more environmentally friendly refrigerant that is flammable may offer a lower cost option to the HVACR equipment owner than replacing the HVACR system entirely. However, because the replacement refrigerants are flammable, modifications may be needed to the HVACR system to safely utilize the flammable refrigerants.

A refrigerant may be considered environmentally friendly when it has a 100 year direct global warming potential (GWP) of less than 148 times that of carbon dioxide. GWP is a relative measure of how much heat a greenhouse gas traps in the atmosphere as compared to carbon dioxide as a reference. A GWP is calculated over a specific time interval, commonly 20, 100 or 480 years. GWP is expressed as a factor of carbon dioxide (whose GWP is standardized to 1). The higher GWP potential for a refrigerant results in greater potential to contribute to global climate change.

Sometimes, when formulating refrigerants that are considered environmentally friendly, such as, but not limited to, DR-55, R-454B, or R-32, a flammability of the refrigerant may be increased. For example, DR-55 has a relatively lower GWP than R-410A. However, DR-55 has a relatively higher flammability than R-410A. Accordingly, when retrofitting an HVACR system that utilizes R-410A as a refrigerant with DR-55, additional modifications to equipment of the HVACR system may be made to account for the increased flammability.

Figure 1:
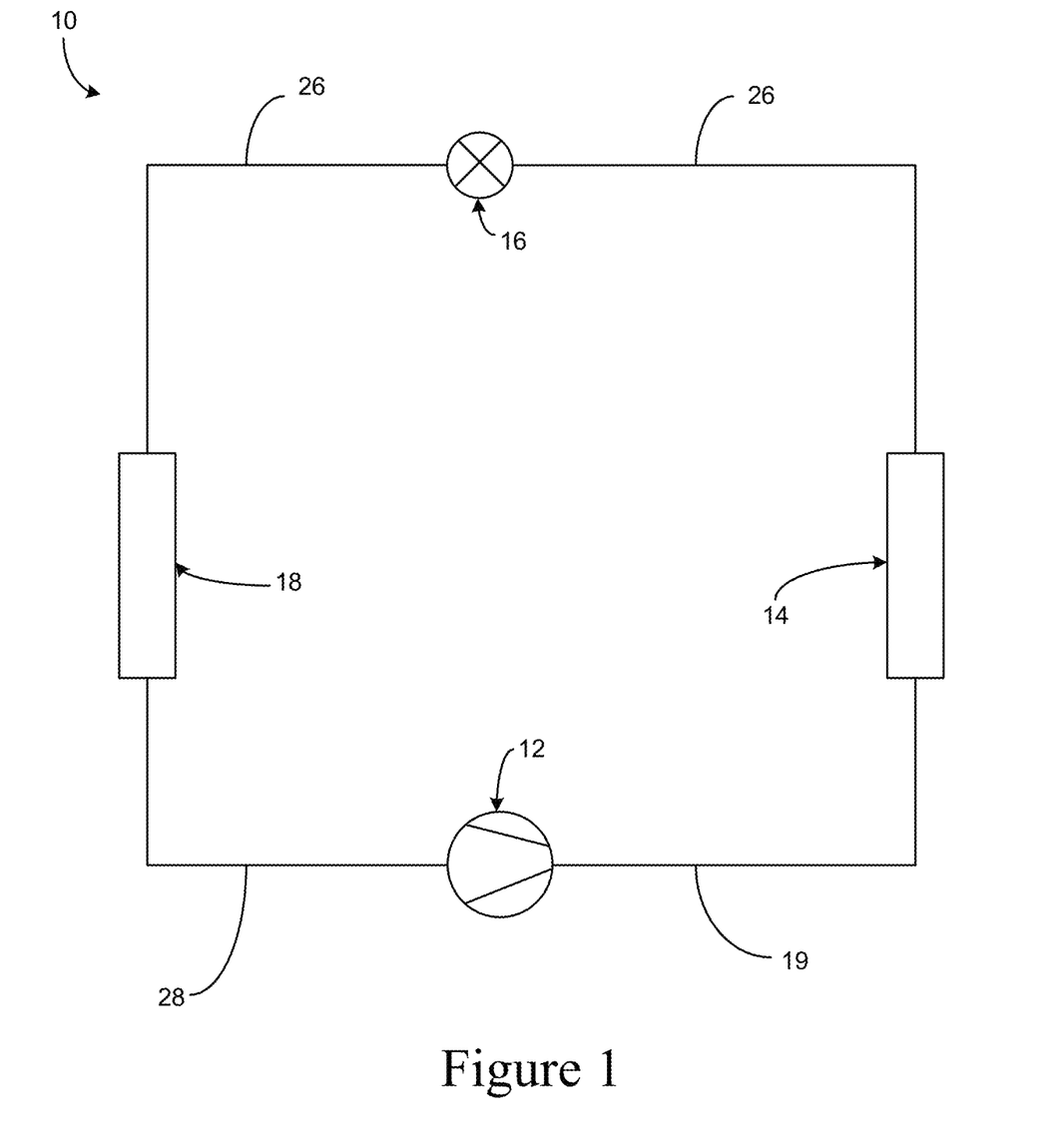
FIG. 1 is a schematic diagram of a refrigeration circuit, according to an embodiment.

FIG. 1 is a schematic diagram of a refrigerant circuit 10, according to an embodiment. The refrigerant circuit 10 generally includes a compressor 12, a condenser 14, an expansion device 16 (e.g., expansion valve), and an evaporator 18. The refrigerant circuit 10 is an example and can be modified to include additional components. For example, in an embodiment, the refrigerant circuit 10 can include other components such as, but not limited to, an economizer heat exchanger, one or more flow control devices, a receiver tank, a dryer, a suction-liquid heat exchanger, or the like.

The refrigerant circuit 10 can generally be applied in a variety of systems used to control an environmental condition (e.g., temperature, humidity, air quality, or the like) in a space (generally referred to as a conditioned space). Examples of such systems include, but are not limited to, HVACR systems, transport refrigeration systems, or the like.

The compressor 12, condenser 14, expansion device 16, and evaporator 18 are fluidly connected via refrigerant lines 19, 26, and 28. In an embodiment, the refrigerant lines 19, 26, and 28 can alternatively be referred to as the refrigerant conduits 19, 26, and 28, or the like.

In an embodiment, the refrigerant circuit 10 can be configured to be a cooling system (e.g., an air conditioning system) capable of operating in a cooling mode. In an embodiment, the refrigerant circuit 10 can be configured to be a heat pump system that can operate in both a cooling mode and a heating/defrost mode.

The refrigerant circuit 10 can operate according to generally known principles. The refrigerant circuit 10 can be configured to heat or cool a gaseous process fluid (e.g., a heat transfer medium or fluid such as, but not limited to, air or the like), in which case the refrigerant circuit 10 may be generally representative of an air conditioner or heat pump.

In operation, the compressor 12 compresses a working fluid (e.g., a heat transfer fluid such as a refrigerant or the like) from a relatively lower pressure gas to a relatively higher-pressure gas. The relatively higher-pressure gas is also at a relatively higher temperature, which is discharged from the compressor 12 and flows through refrigerant line 19 to the condenser 14. The working fluid flows through the condenser 10 and rejects heat to a process fluid (e.g., water, air, etc.), thereby cooling the working fluid. The cooled working fluid, which is now in a liquid form, flows to the expansion device 16 via the refrigerant line 26. The expansion device 16 reduces the pressure of the working fluid. As a result, a portion of the working fluid is converted to a gaseous form. The working fluid, which is now in a mixed liquid and gaseous form flows to the evaporator 18 via the remainder of refrigerant line 26. The working fluid flows through the evaporator 18 and absorbs heat from a process fluid (e.g., water, air, etc.), heating the working fluid, and converting it to a gaseous form. The gaseous working fluid then returns to the compressor 12 via the refrigerant line 28. The above-described process continues while the refrigerant circuit is operating, for example, in a cooling mode (e.g., while the compressor 12 is enabled).

Figure 2:
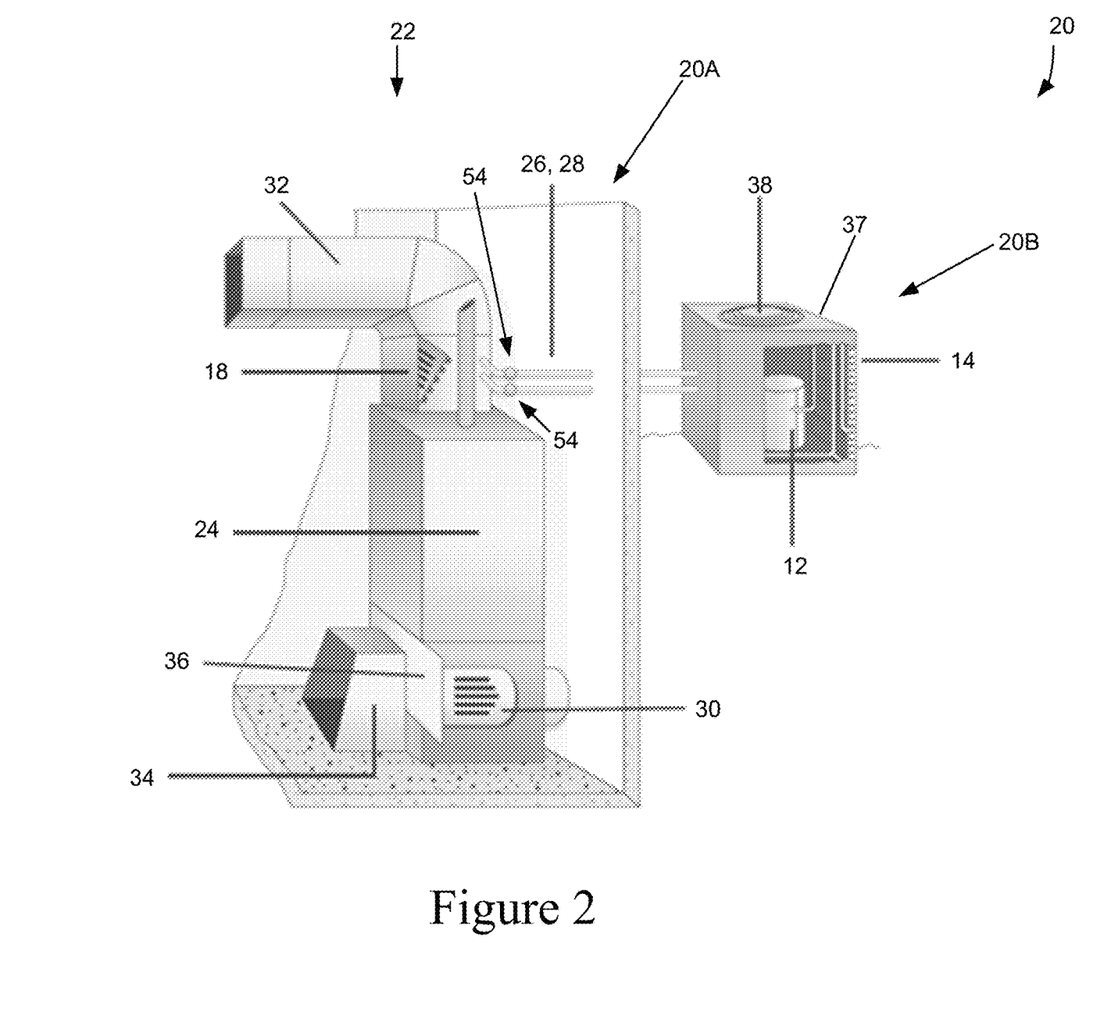
FIG. 2 is a schematic diagram of a heating, ventilation, air conditioning, and refrigeration (HVACR) system, according to an embodiment.

FIG. 2 is a schematic diagram of an HVACR system 20, according to an embodiment. The HVACR system 20 includes an indoor system 20A and an outdoor system 20B. The indoor system 20A is disposed within an interior space 22, while the outdoor system 20B is located outside the interior space 22. In an embodiment, the outdoor system 20B may be located on an opposite side of a wall forming the interior space 22. In an embodiment, the outdoor system 20B can alternatively be located within the interior space 22, such that the HVACR system 20 includes the indoor system 20A and the outdoor system 20B. The HVACR system 20 may be representative of a residential HVACR system, according to an embodiment.

The indoor system 20A generally includes HVACR equipment 24. In the illustrated embodiment, the HVACR equipment 24 may be representative of an air handling unit. As such, the HVACR equipment 24 may be referred to as the air handling unit 24. The air handling unit 24 includes a blower 30. The blower 30 is configured to force air across an evaporator 18 of the refrigerant circuit (e.g., refrigerant circuit 10 in FIG. 1). The evaporator 18 may be disposed within an air supply duct 32. The air blown across the evaporator 18 exchanges heat with the refrigerant in the refrigerant circuit 10 to control a temperature of the air being supplied to one or more conditioned spaces of the HVACR system 20. The air supply duct 32 provides the temperature controlled air to the various conditioned spaces. It will be appreciated that the air supply duct 32 would be connected to a network of ducts in the HVACR system 20 to supply the temperature controlled air to the various conditioned spaces. A return air duct 34 receives air from the one or more conditioned spaces, and provides the air to the blower 30. Prior to being provided to the blower 30, the return air is filtered via a filter 36.

The outdoor system 20B generally includes a compressor 12 and a condenser 14 disposed within a housing 37. The housing 37 may sometimes be referred to as a cabinet or the like. A condenser fan 38 can be included to draw air across the condenser 14 so that refrigerant of the refrigerant circuit 10 exchanges heat with the air.

The refrigerant circuit 10 includes features in the indoor system 20A and features in the outdoor system 20B. Refrigerant lines 26, 28 connect in fluid communication. In an embodiment in which the HVACR system 20 is an air conditioning unit, one of the refrigerant lines 26, 28 can be used to carry refrigerant from the outdoor system 20B to the indoor system 20A, and the other of the refrigerant lines 26, 28 can be used to carry refrigerant from the indoor system 20A to the outdoor system 20B. In an embodiment in which the HVACR system 20 is a heat pump unit, a direction of flow of the refrigerant through refrigerant lines 26, 28 may be based on whether the heat pump is operating in a heating mode or a cooling mode. The refrigerant lines 26, 28 may have sections disposed within the indoor system 20A that include brazed, soldered, or mechanical refrigerant joints 54 (described in further detail in accordance with FIG. 3 below) that are external to the air handling unit 24. In an embodiment in which the HVACR system 20 is retrofitted with a refrigerant that is more environmentally friendly than, for example, R410A, the joints may be further sealed to prevent leaking of the replacement refrigerant, which may be flammable, into the space in which the indoor system 20A is disposed. In an embodiment, the existing refrigerant that is removed can be reclaimed, recycled, and/or reformulated into lower GWP refrigerants.

Figure 3:
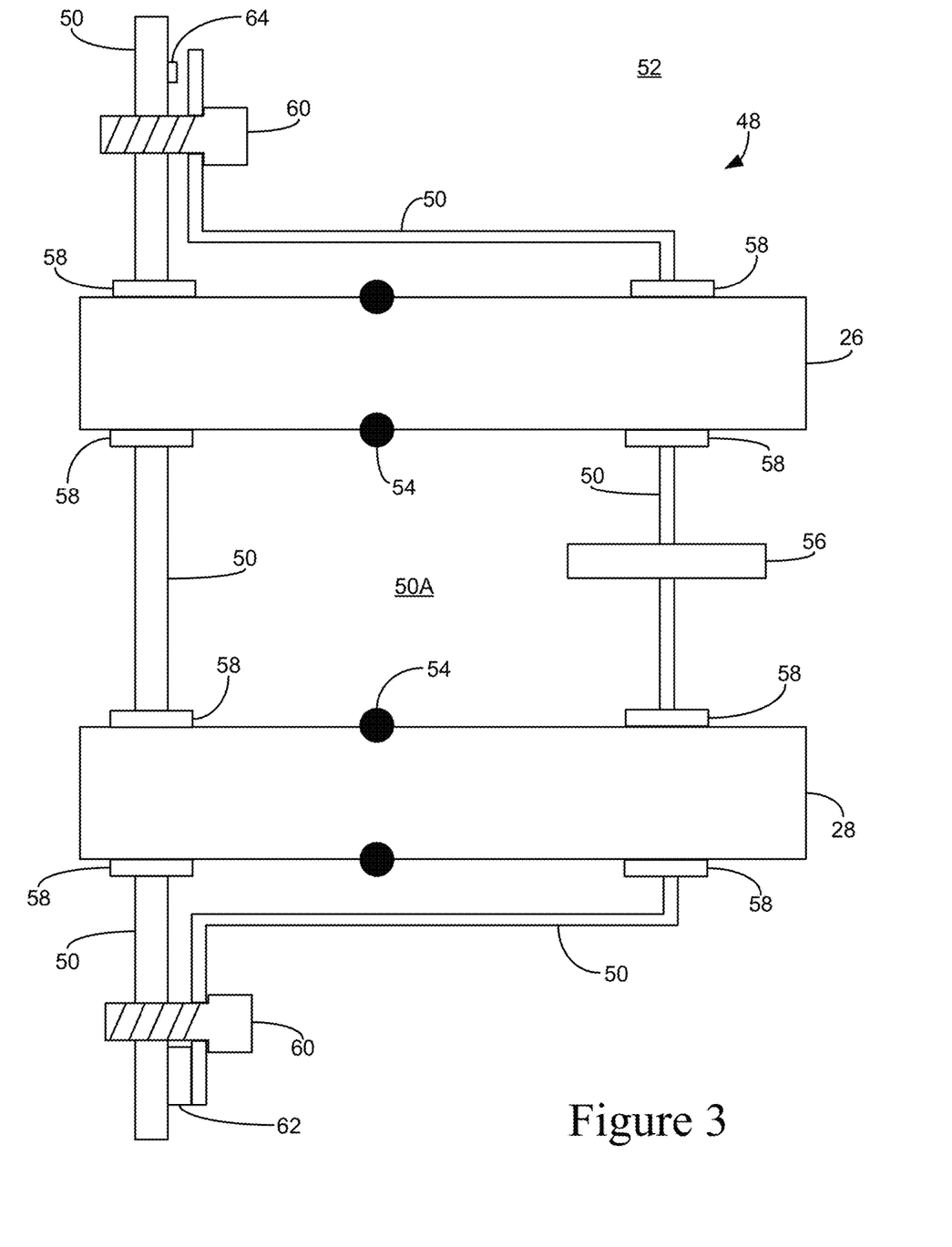
FIG. 3 is a schematic diagram of a sealed enclosure, according to an embodiment.

FIG. 3 is schematic diagram of an enclosure 48 for joints 54 of the refrigerant lines 26, 28 (FIG. 2), according to an embodiment. The joints 54 can include joints that are brazed, soldered, or mechanically secured to connect the refrigerant lines 26, 28 to the air handling unit 24. The enclosure 48 can, for example, in a situation in which one of the joints 54 develops a leak, contain the refrigerant leaking therefrom and vent the refrigerant (e.g., via vent aperture 70 in FIG. 4 below) to the air handling unit 24 so that the leaking refrigerant can be mixed with air and diluted to a safe level. In an embodiment, the air handling unit 24 may vent the diluted mixture including air and refrigerant to a space within the building.

The enclosure 48 includes a housing 50. An interior space 50A is formed in the housing 50. The refrigerant lines 26 and 28 extend through the enclosure 48 such that the joints 54 are disposed inside the interior space 50A of the housing 50. The space outside the housing is identified as the space 52 for purposes of description. A refrigerant sensor 56 is secured to the housing 50. The refrigerant sensor 56 can detect a refrigerant leak in the interior space 50A. A plurality of gaskets 58 can be included to seal a connection location between the refrigerant lines 26, 28 and the housing 50. In an embodiment, the housing could be secured to the refrigerant lines 26, 28 by, for example, a brazed or welded connection, in which case the gaskets 58 may not be included. A plurality of fasteners 60 such as, but not limited to, bolts, screws, rivets, combinations thereof, or the like, secure the enclosure 50 to the air handling unit 24. In an embodiment, a gasket 60 can be disposed in the connection to provide additional sealing. An alarm 64 can be disposed between the pieces of the enclosure 48 such that if the air handling unit 24 is turned on without the enclosure 48 secured, an alarm signal is generated. In an embodiment, the alarm signal can be an audible signal, an electronic signal that prevents operation of the HVACR system 20, combinations thereof, or the like.

Figure 4:
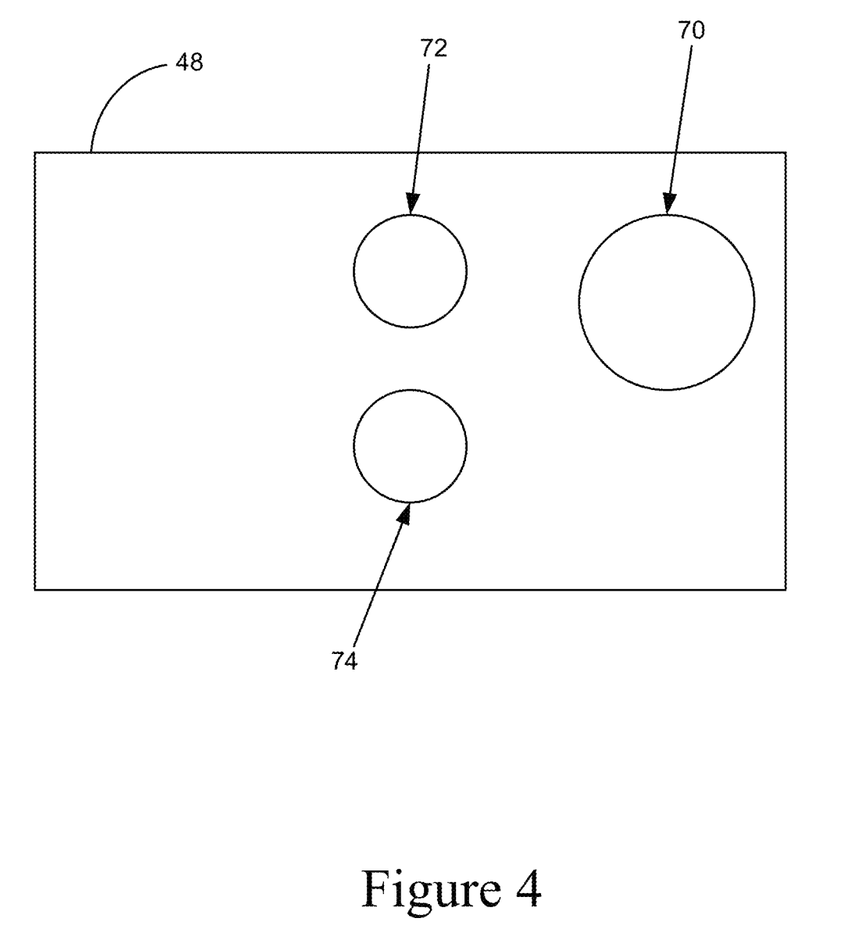
FIG. 4 is a schematic diagram of the sealed enclosure, according to an embodiment.

FIG. 4 is a schematic diagram of the enclosure 48, according to an embodiment. FIG. 4 illustrates a vent aperture 70, and refrigerant line apertures 72, 74 disposed in the enclosure 48. The vent aperture 70 is fluidly connected to the air handling unit 24 so that if a refrigerant at joints 54 (FIG. 3) inside of the enclosure 48 leaks from the refrigerant lines 26, 28, the refrigerant can be vented via the air handling unit 24. The blower 30 may be enabled to provide an airflow for diluting the leaked refrigerant. The refrigerant line apertures 72, 74 are sized to accommodate refrigerant lines 26, 28 therethrough. In accordance with the description regarding FIG. 3 above, a gasket or seal may be included between the refrigerant lines 26, 28 and the refrigerant line apertures 72, 74 so that an area inside the enclosure 48 is fluidly sealed from an area outside the enclosure 48.

In an embodiment, an area of the vent aperture 70 is generally larger than an area of each of the refrigerant line apertures 72, 74. For example, in an embodiment, the vent aperture 70 may be at or about 1.5 to at or about 4 times greater in area than the area of one of the refrigerant line apertures 72, 74. In an embodiment, the vent aperture 70 may be at or about 2 times greater in area than the area of one of the refrigerant line apertures 72, 74. It is to be appreciated that FIG. 4 is not drawn to scale.

Figure 5A:
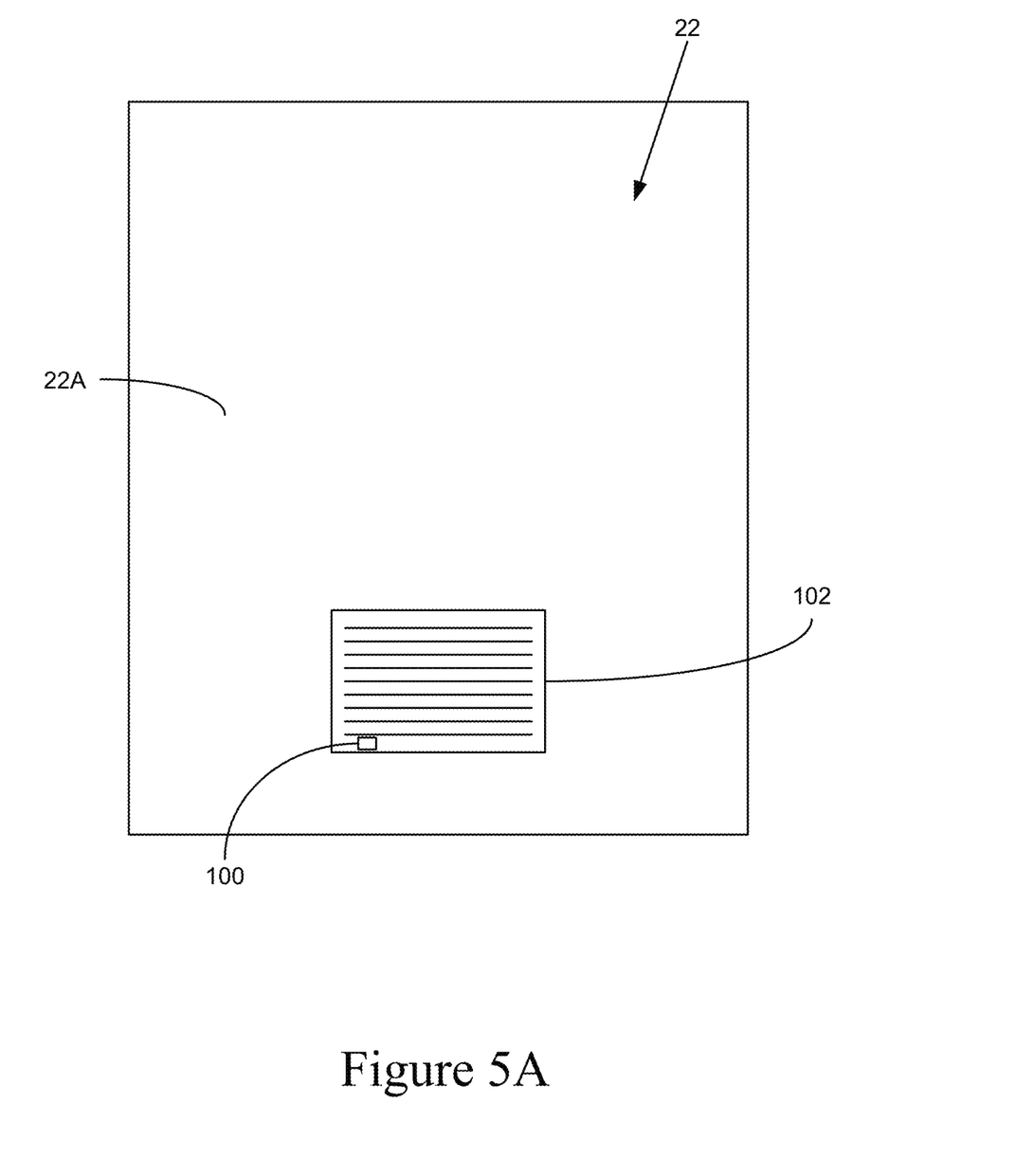
FIGS. 5A and 5B are schematic diagrams of a refrigerant sensor, according to an embodiment.
Figure 5B:
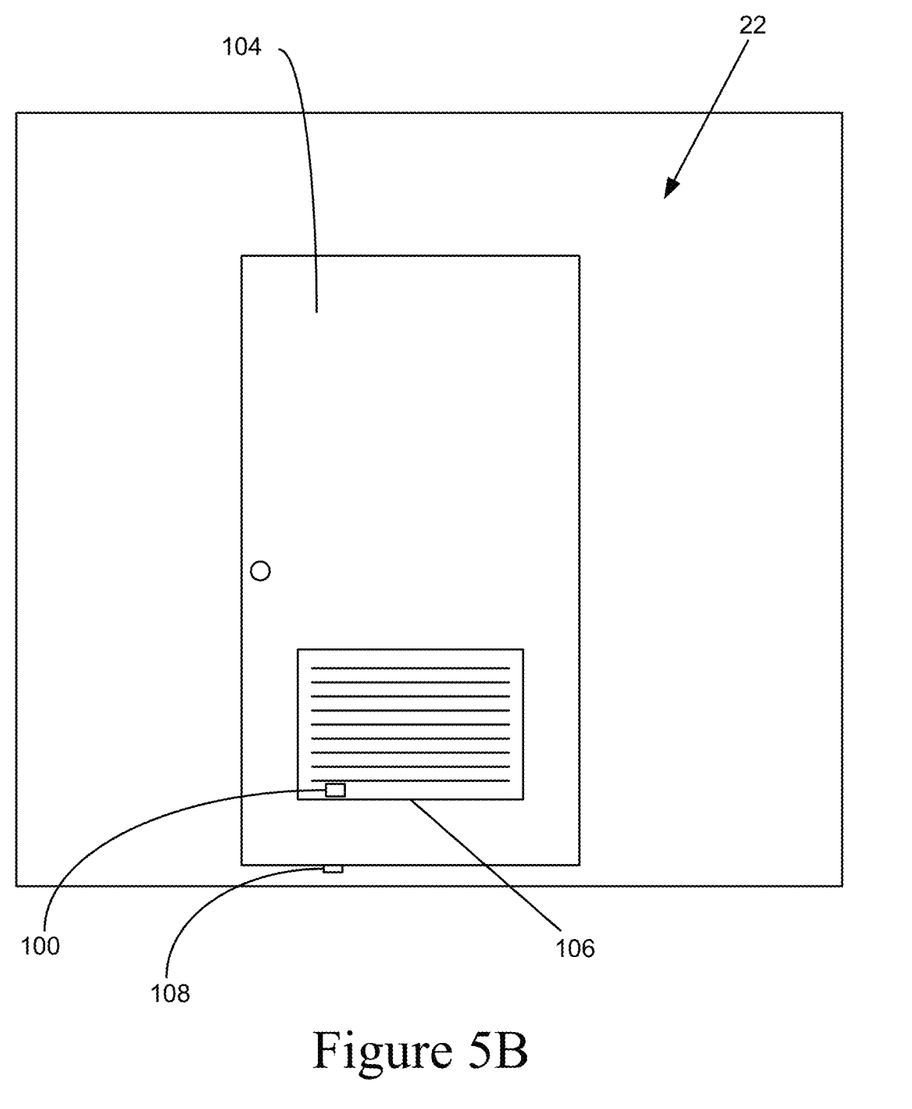

FIGS. 5A and 5B are schematic diagrams of a refrigerant sensor 100 within the interior space 22, according to an embodiment. FIG. 5A illustrates a vent 102 in a wall 22A of the interior space 22 including the indoor system 20A (FIG. 2). The refrigerant sensor 100 may be included in a location of the vent 102. In an embodiment, the refrigerant sensor 100 can be disposed in a location near a bottom of the vent 102. In an embodiment, the refrigerant sensor 100 can be placed in a different location of the vent 102. In an embodiment, the vent 102 can include a plurality of refrigerant sensors 100. The refrigerant sensor 100 may be, for example, an oxygen depletion sensor that indicates when a refrigerant leak has occurred from depletion in an amount of oxygen in the interior space 22. In an embodiment, the refrigerant sensor 100 can be electronically connected to, for example, a controller of the HVACR system 20. In such an embodiment, if the refrigerant sensor 100 detects a refrigerant leak, the HVACR system 20 can generate an alarm signal; enable the blower 30; enable another fan in the interior space 22; combinations thereof; or the like. In an embodiment, the vent 102 may already be present in the interior space 22. In an embodiment, the vent 102 may be added to the interior space 22. In an embodiment, a plurality of vents 102 may be present in the interior space 22, and one or more can be configured to include the refrigerant sensor 100.

FIG. 5B illustrates a vent 106 in a door 104 of the interior space 22 including the indoor system 20A (FIG. 2). Similar to the placement of the refrigerant sensor 100 in the vent 102 in the wall 22A in FIG. 5A, the refrigerant sensor 100 can be placed in a location near a bottom of the vent 106 within the door 104. In an embodiment, the refrigerant sensor 100 can be placed in a different location of the vent 106. In an embodiment, a plurality of refrigerant sensors 100 can be included in the vent 106. It will be appreciated that the vent 106 may be present in the door 104, according to an embodiment, while in another embodiment, the vent 106 may be newly formed in the door 104. In another embodiment, a refrigerant sensor 108 can be placed on a bottom edge of the door 104. In an embodiment, the refrigerant sensor 108 can be placed on the bottom edge of the door 104 and the refrigerant sensor 100 can be placed in the vent 106. It will be appreciated that in an embodiment, the refrigerant sensor 100 can be placed in the vent 106 and another refrigerant sensor 100 can be placed in the vent 102 (FIG. 5A).

The refrigerant sensor 108 can be the same as or similar to the refrigerant sensor 100. For example, the refrigerant sensor 108 may be an oxygen depletion sensor that indicates when a refrigerant leak has occurred from depletion in an amount of oxygen in the interior space 22. In an embodiment, the refrigerant sensor 108 can be electronically connected to, for example, a controller of the HVACR system 20. In such an embodiment, if the refrigerant sensor 100 detects a refrigerant leak, the HVACR system 20 can generate an alarm signal; enable the blower 30; enable another fan in the interior space 22; combinations thereof; or the like.

Aspects:

Any one of aspects 1-5 can be combined with any one of aspects 6-11 or 12-18. Any one of aspects 6-11 can be combined with any one of aspects 12-18.

Aspect 1. A method of retrofitting a heating, ventilation, air conditioning, and refrigeration system (HVACR) including one or more brazed, soldered, or mechanical connections between refrigerant lines, the method comprising:

removing a refrigerant from the HVACR system, the refrigerant being a non-flammable refrigerant;

installing an enclosure over the one or more brazed, soldered, or mechanical connections between refrigerant lines;

adding refrigerant to the HVACR system, the refrigerant being added having a global warming potential (GWP) that is relatively lower than the refrigerant removed from the HVACR system, and the refrigerant being added having a relatively higher flammability than the refrigerant removed from the HVACR system.

Aspect 2. The method according to aspect 1, further comprising:

adding ventilation to the room by one of installing one or more vents to a wall of a space in which the HVACR system is disposed or installing one or more vents to a door of the space in which the HVACR system is disposed.

Aspect 3. The method according to any one of aspects 1 or 2, further comprising:

installing one or more refrigerant sensors in a space in which the HVACR system is disposed.

Aspect 4. The method according to any one of aspects 1-3, further comprising:

replacing an expansion device.

Aspect 5. The method according to any one of aspects 1-4, further comprising:

capturing the removed refrigerant for repurposing.

Aspect 6. A heating, ventilation, air conditioning, and refrigeration (HVACR) system, comprising:

an indoor system, the indoor system including:
one or more refrigerant lines;
a brazed, soldered, or mechanical connection; and
an enclosure, the enclosure including a housing that encloses the brazed, soldered, or mechanical connection, and
a refrigerant circuit, wherein a refrigerant in the refrigerant circuit includes a flammable refrigerant.

Aspect 7. The HVACR system according to aspect 6, further comprising an outdoor system, the outdoor system including a compressor, condenser, and a condenser fan.

Aspect 8. The HVACR system according to any one of aspects 6 or 7, wherein the indoor system is disposed in an occupied space of a building.

Aspect 9. The HVACR system according to aspect 8, wherein the occupied space includes one or more vents disposed in one of a wall and a door of the occupied space.

Aspect 10. The HVACR system according to aspect 8, wherein the enclosure includes an alarm that generates an alarm signal in response to detection of a refrigerant leak.

Aspect 11. The HVACR system according to aspect 10, wherein the enclosure includes a refrigerant sensor that is electronically connected to the alarm for indicating when a refrigerant leak is detected.

Aspect 12. A system, comprising:
an interior space; and
an HVACR system, the HVACR system including an indoor system and an outdoor system, the indoor system being disposed within the interior space, wherein the indoor system includes one or more refrigerant lines and a brazed, soldered, or mechanical connection, an enclosure including a housing that encloses the brazed, soldered, or mechanical connection, and a refrigerant circuit, wherein a refrigerant in the refrigerant circuit includes a flammable refrigerant.

Aspect 13. The system according to aspect 12, wherein the HVACR system includes an outdoor system disposed outside of the interior space, the outdoor system including a compressor, condenser, and a condenser fan.

Aspect 14. The system according to any one of aspects 12 or 13, wherein the interior space includes one or more vents disposed in one of a wall and a door of the interior space.

Aspect 15. The system according to aspect 14, wherein the interior space includes one or more refrigerant sensors disposed in at least one of the one or more vents.

Aspect 16. The system according to aspect 15, wherein the one or more refrigerant sensors are oxygen depletion sensors.

Aspect 17. The system according to any one of aspects 12-16, wherein the enclosure includes an alarm that generates an alarm signal in response to detection of a refrigerant leak within the housing of the enclosure.

Aspect 18. The system according to aspect 17, wherein the enclosure includes a refrigerant sensor that is electronically connected to the alarm for indicating when a refrigerant leak is detected.

The terminology used in this specification is intended to describe particular embodiments and is not intended to be limiting. The terms "a," "an," and "the" include plural forms as well, unless clearly indicated otherwise. The terms "comprises" and/or "comprising," when used, indicated the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts, without departing from the scope of the present disclosure. The word "embodiment" may, but does not necessarily, refer to the same embodiment. The embodiments and disclosure are examples only. Other and further embodiments may be devised without departing from the basic scope thereof, with the true scope and spirit of the disclosure being indicated by the claims that follow.

What is claimed is:

1. A method of retrofitting a heating, ventilation, air conditioning, and refrigeration system (HVACR) including an air handling unit and refrigerant lines having one or more brazed, soldered, or mechanical joints to connect the refrigerant lines to the air handling unit, the one or more brazed, soldered, or mechanical joints being spaced apart from the air handling unit, the method comprising:

removing a refrigerant from the HVACR system, the refrigerant being a non-flammable refrigerant;

installing an enclosure over the one or more brazed, soldered, or mechanical joints that are spaced apart from the air handling unit, the enclosure including a vent aperture, and wherein installing the enclosure includes fluidly connecting the vent aperture to the air handling unit so that the enclosure vents into the air handling unit;

adding refrigerant to the HVACR system, the refrigerant being added having a global warming potential (GWP) that is relatively lower than the refrigerant removed from the HVACR system, and the refrigerant being added having a relatively higher flammability than the refrigerant removed from the HVACR system.

2. The method according to claim 1, further comprising:
adding ventilation to the room by one of installing one or more vents to a wall of a space in which the HVACR system is disposed or installing one or more vents to a door of the space in which the HVACR system is disposed.

3. The method according to claim 1, further comprising:
installing one or more refrigerant sensors in a space in which the HVACR system is disposed.

4. The method according to claim 1, further comprising:
replacing an expansion device.

5. The method according to claim 1, further comprising:
capturing the removed refrigerant for repurposing.

6. The method according to claim 1, wherein one of the one or more brazed, soldered, or mechanical joints connects two sections of one of the refrigerant lines.

7. The method according to claim 1, wherein the air handling unit is configured to discharge leaked refrigerant vented from the enclosure into an interior space of a building.

* * * * *